US011695171B2

(12) United States Patent
Maguire et al.

(10) Patent No.: US 11,695,171 B2
(45) Date of Patent: *Jul. 4, 2023

(54) BATTERY ASSEMBLY WITH MULTI-FUNCTION STRUCTURAL ASSEMBLY

(71) Applicant: Ford Global Technologies, LLC, Dearborn, MI (US)

(72) Inventors: Patrick Daniel Maguire, Ann Arbor, MI (US); John Peter Bilezikjian, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,022

(22) Filed: Apr. 8, 2022

(65) Prior Publication Data

US 2022/0231351 A1 Jul. 21, 2022

Related U.S. Application Data

(63) Continuation of application No. 14/716,092, filed on May 19, 2015, now Pat. No. 11,302,973.

(51) Int. Cl.
*H01M 10/625* (2014.01)
*H01M 10/6556* (2014.01)
(Continued)

(52) U.S. Cl.
CPC ..... *H01M 10/625* (2015.04); *H01M 10/0481* (2013.01); *H01M 10/613* (2015.04); *H01M 10/647* (2015.04); *H01M 10/6554* (2015.04); *H01M 10/6555* (2015.04); *H01M 10/6556* (2015.04); *H01M 10/6557* (2015.04); *H01M 50/209* (2021.01); *H01M 50/24* (2021.01); *H01M 10/04* (2013.01); *H01M 10/0468* (2013.01); *H01M 10/6568* (2015.04); *H01M 50/103* (2021.01); *H01M 50/233* (2021.01); *H01M 2220/20* (2013.01)

(58) Field of Classification Search
CPC .......... H01M 10/625; H01M 10/0481; H01M 10/613; H01M 10/647; H01M 10/6554; H01M 10/6555; H01M 10/6556; H01M 10/6557; H01M 10/0468; H01M 10/6568; H01M 10/04; H01M 50/209; H01M 50/24; H01M 50/103; H01M 50/204; H01M 50/20; H01M 50/211; H01M 50/238; H01M 50/242; H01M 2220/20
See application file for complete search history.

(56) References Cited

U.S. PATENT DOCUMENTS 11,302,973 B2 * 4/2022 Maguire ............. H01M 10/625
2008/0280194 A1 * 11/2008 Okada ................ H01M 50/264
429/99

(Continued)

*Primary Examiner* — Matthew W Van Oudenaren
(74) *Attorney, Agent, or Firm* — David B. Kelley; Carlson, Gaskey & Olds, P.C.

(57) ABSTRACT

A battery assembly according to an exemplary aspect of the present disclosure includes, among other things, a first cell stack including a plurality of battery cells and a structural assembly including a first pocket sized and shaped to receive the first cell stack. The structural assembly is configured to assert a compressive load on the first cell stack and at least partially enclose the first cell stack.

18 Claims, 4 Drawing Sheets

(51) Int. Cl.
  *H01M 10/647* (2014.01)
  *H01M 10/6554* (2014.01)
  *H01M 10/6557* (2014.01)
  *H01M 10/613* (2014.01)
  *H01M 10/04* (2006.01)
  *H01M 10/6555* (2014.01)
  *H01M 50/24* (2021.01)
  *H01M 50/209* (2021.01)
  *H01M 10/6568* (2014.01)
  *H01M 50/103* (2021.01)
  *H01M 50/233* (2021.01)

(56) References Cited

U.S. PATENT DOCUMENTS

2012/0156543 A1\* 6/2012 Cicero .............. H01M 10/0481
 429/120
2014/0272514 A1\* 9/2014 Qi ....................... H01M 10/625
 429/158
2014/0302360 A1\* 10/2014 Klammler ........... H01M 10/625
 429/72

\* cited by examiner

BATTERY ASSEMBLY WITH MULTI-FUNCTION STRUCTURAL ASSEMBLY

RELATED APPLICATIONS

This application is a continuation of prior U.S. application Ser. No. 14/716,092, filed May 19, 2015, the entirety of which is herein incorporated by reference.

TECHNICAL FIELD

This disclosure relates to a battery assembly for an electrified vehicle. The battery assembly includes a structural assembly configured to retain, enclose and/or thermally manage a plurality of battery cells.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

High voltage battery assemblies are employed to power the electric machines of electrified vehicles. The battery assemblies include cell stacks constructed of a plurality of battery cells. An array structure binds the battery cells of each cell stack. A separate enclosure assembly houses and seals the battery cells from the exterior environment. Yet another separate structure, typically configured as a cold plate, is commonly positioned in contact with the battery cells to thermally manage the heat generated by the cells.

SUMMARY

A battery assembly according to an exemplary aspect of the present disclosure includes, among other things, a first cell stack including a plurality of battery cells and a structural assembly including a first pocket sized and shaped to receive the first cell stack. The structural assembly is configured to assert a compressive load on the first cell stack and at least partially enclose the first cell stack.

In a further non-limiting embodiment of the foregoing battery assembly, the plurality of battery cells are individual cells disposed side-by-side and unbound relative to one another.

In a further non-limiting embodiment of either of the foregoing battery assemblies, each of the plurality of battery cells is contiguous with at least one wall of the structural assembly.

In a further non-limiting embodiment of any of the foregoing battery assemblies, a second cell stack is received within a second pocket of the structural assembly.

In a further non-limiting embodiment of any of the foregoing battery assemblies, a wall of the structural assembly separates the first pocket from the second pocket.

In a further non-limiting embodiment of any of the foregoing battery assemblies, the structural assembly includes a plurality of walls that are joined together.

In a further non-limiting embodiment of any of the foregoing battery assemblies, at least one of the plurality of walls includes a channel configured to communicate a fluid to thermally condition the plurality of battery cells.

In a further non-limiting embodiment of any of the foregoing battery assemblies, a bus bar module is positioned over top of the first cell stack.

In a further non-limiting embodiment of any of the foregoing battery assemblies, a base is positioned at a bottom of the structural assembly and a cover is positioned at a top of the structural assembly.

In a further non-limiting embodiment of any of the foregoing battery assemblies, a resilient envelope is disposed around an entire perimeter of the structural assembly.

A battery assembly according to another exemplary aspect of the present disclosure includes, among other things, a cell stack and a structural assembly at least partially surrounding the cell stack, the structural assembly including a plurality of walls each including at least one channel configured to communicate a fluid to thermally condition the cell stack.

In a further non-limiting embodiment of the foregoing battery assembly, the structural assembly includes a first wall having a first channel of a first cross-sectional area and a second wall having a second channel of a second cross-sectional area greater than the first cross-section area.

In a further non-limiting embodiment of either of the foregoing battery assemblies, the cell stack includes a plurality of battery cells that are unbound to one another prior to insertion into a pocket of the structural assembly.

In a further non-limiting embodiment of any of the foregoing battery assemblies, the structural assembly is configured to assert a compressive load on the cell stack after insertion of the cell stack into the pocket.

In a further non-limiting embodiment of any of the foregoing battery assemblies, the structural assembly is configured in a figure-eight shape.

A method according to another exemplary aspect of the present disclosure includes, among other things, compressing a cell stack of a battery assembly and inserting the cell stack into a pocket of a structural assembly. The cell stack is unbound prior to insertion into the pocket and the structural assembly is configured to apply a compressive load against the cell stack after insertion into the pocket.

In a further non-limiting embodiment of the foregoing method, the compressing step includes disposing a plurality of battery cells of the cell stack between opposing end spacers and applying a force to the cell stack at the opposing end spacers.

In a further non-limiting embodiment of either of the foregoing methods, the structural assembly is configured to at least partially enclose the cell stack.

In a further non-limiting embodiment of any of the foregoing methods, the structural assembly is configured to thermally manage a plurality of battery cells of the cell stack.

In a further non-limiting embodiment of any of the foregoing methods, the method includes sealing the cell stack of the battery assembly relative to an exterior environment after the inserting step.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery assembly for an electrified vehicle. The battery assembly may include one or more cell stacks each having a plurality of individual battery cells positioned adjacent to one another. A structural assembly of the battery assembly includes pockets that are sized and shaped to receive the cell stacks. In some embodiments, the structural assembly is configured to assert a compressive load against each cell stack and at least partially enclose the cell stacks. In other embodiments, the structure assembly is configured to thermally condition the battery cells of each cell stack. The multi-function structural assembly reduces the number and size of the components of the battery assembly, substantially eliminates conventional array retention components, and substantially eliminates threaded fastener connections to render a near zero air volume battery assembly. These and other features are discussed in greater detail in the following paragraphs of this detailed description.

Figure 1:
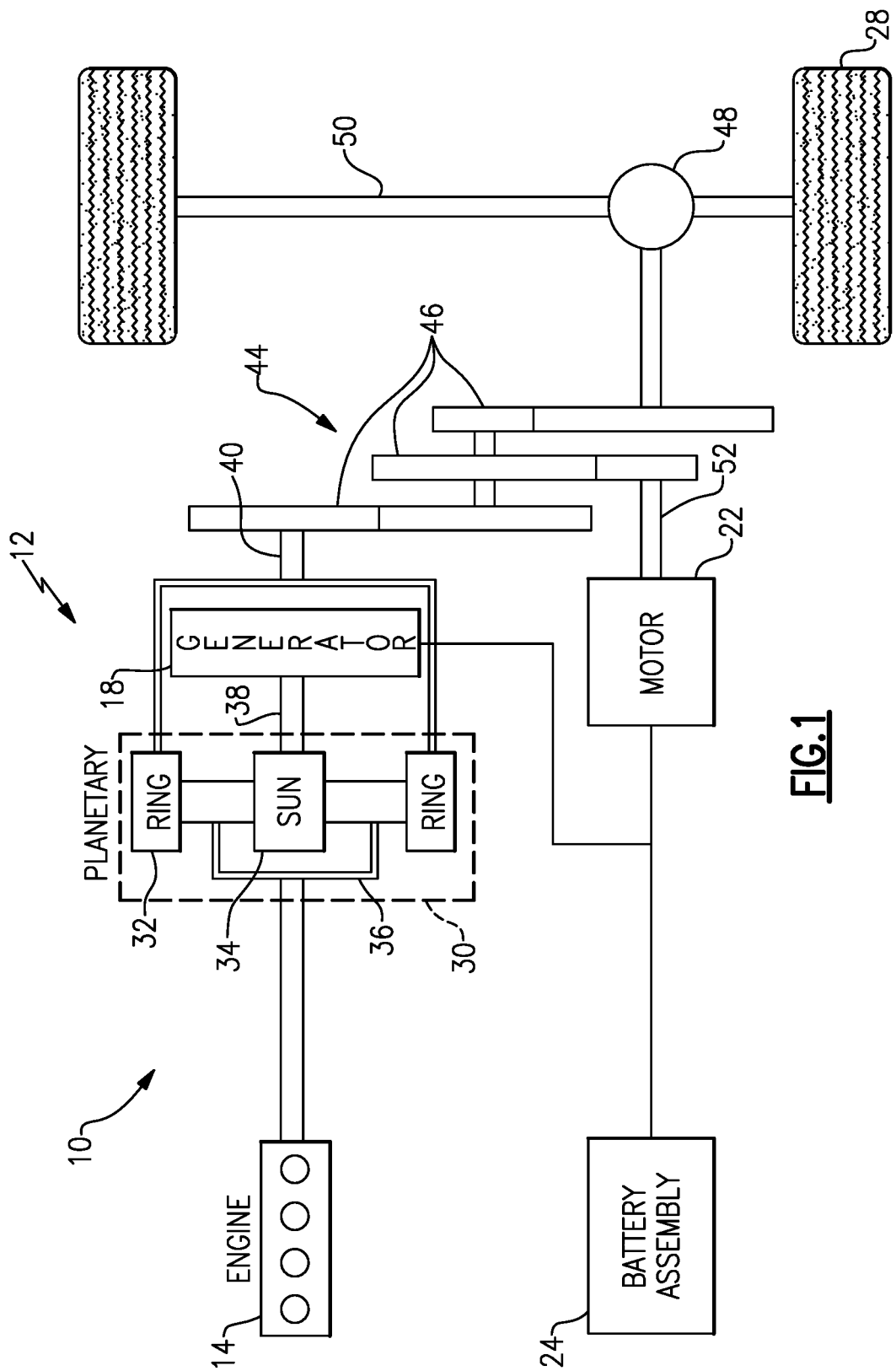
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may include a high voltage traction battery pack that includes a plurality of battery cells capable of outputting electrical power to operate the motor 22 and the generator 18, among other components. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion. The electrified vehicle 12 may be operated in other operating modes in addition to the EV and HEV modes within the scope of this disclosure.

Figure 2:
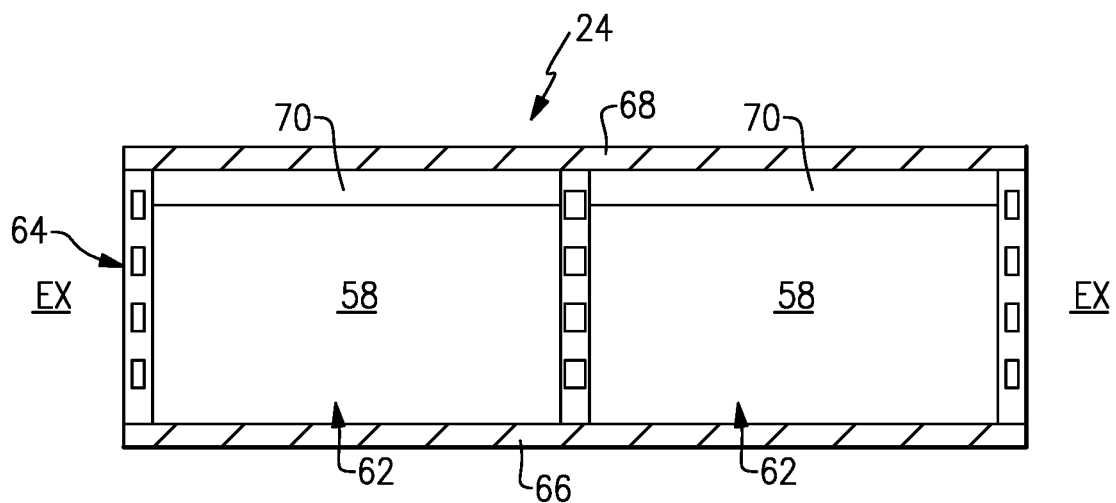
FIG. 2 is a cross-sectional view of a battery assembly according to a first embodiment of this disclosure.

FIG. 2 illustrates a battery assembly 24 that could be employed within an electrified vehicle. For example, the battery assembly 24 could be employed within the electrified vehicle 12 of FIG. 1. The battery assembly 24 includes a plurality of battery cells 58 for supplying electrical power to various components of the electrified vehicle 12. Although a specific number of battery cells 58 are illustrated in the various Figures of this disclosure, the battery assembly 24 could include any amount of cells. In other words, this disclosure is not limited to the specific configuration shown in FIG. 2.

The battery cells 58 may be stacked side-by-side relative to one another (into the page in the cross-sectional view of FIG. 2) to construct one or more cell stacks 62 (i.e., groupings of battery cells). In one embodiment, the battery assembly 24 includes two cell stacks 62. However, the battery assembly 24 could include a single cell stack 62 or multiple cell stacks 62 within the scope of this disclosure.

In one embodiment, the battery cells 58 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The battery assembly 24 may additionally include a multi-function structural assembly 64. For example, the structural assembly 64 may be configured to apply a compressive load against the cell stacks 62, at least partially enclose and seal the cell stacks 62, support and separate the cell stacks 62 from one another, and thermally manage the battery cells 58 of each cell stack 62. These functions are discussed in greater detail below.

A base 66 may be attached to a bottom of the structural assembly 64 and a cover 68 may be attached to the top of the structural assembly 64. The structural assembly 64, the base 66 and the cover 68 combine to enclose the cell stacks 62 such that the cell stacks 62 are substantially sealed from an exterior environment EX.

The battery assembly 24 may additionally include one or more bus bar modules 70. The bus bar modules 70 may be located above each cell stack 62 and are adapted to electrically connect the battery cells 58 of each cell stack 62. In one embodiment, the bus bar modules 70 are disposed between the cell stacks 62 and the cover 68.

Figure 3:
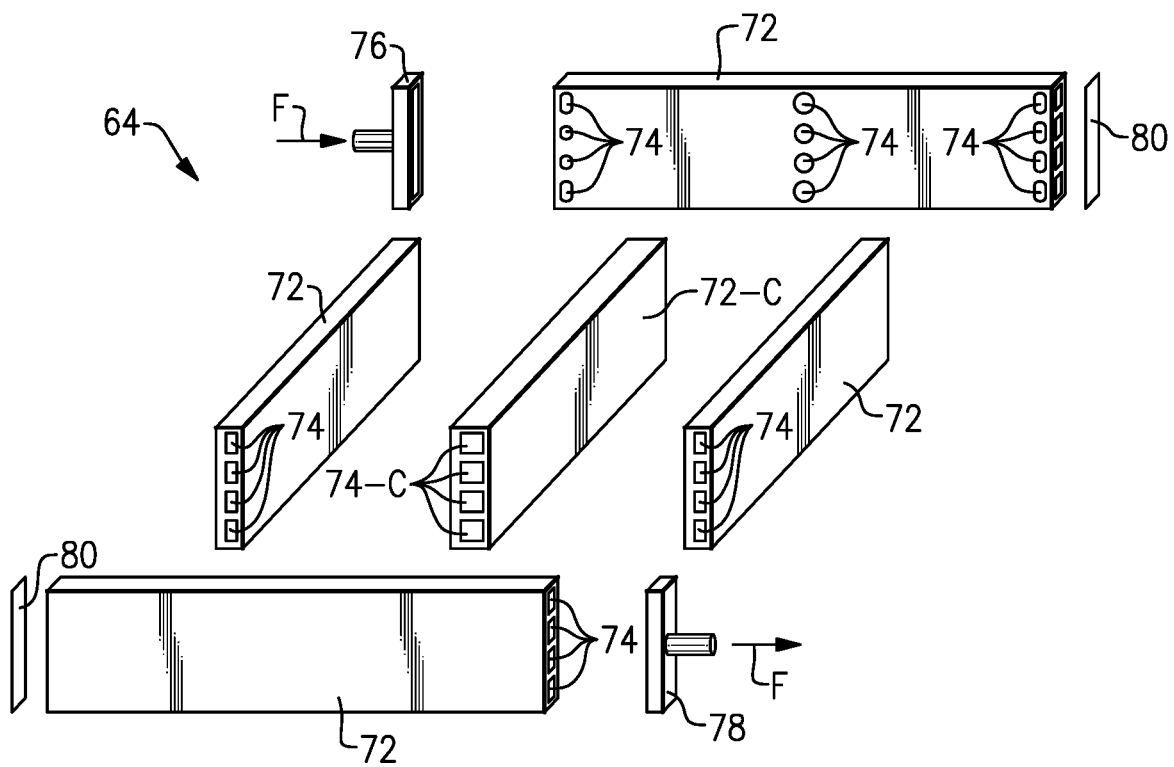
FIG. 3 is an exploded view of a structural assembly of a battery assembly.

FIG. 3, with continued reference to FIG. 2, illustrates a non-limiting embodiment of the structural assembly 64 of the battery assembly 24. The structural assembly 64 includes a plurality of walls 72. The walls 72 may be extruded, cast, molded or manufactured using some other known technique. In one embodiment, the walls 72 are made of aluminum, although other materials are also contemplated within the scope of this disclosure. The plurality of walls 72 may be formed into a desired size and shape and joined together, such as by welding, to construct the rigid structural assembly 64. In one non-limiting embodiment, the walls 72 are joined together to establish a figure-eight shaped design capable of receiving two cell stacks 62 (see FIG. 4). However, other designs are also contemplated, including but not limited to designs in which the structural assembly 64 is configured to receive a single cell stack 62 (see FIG. 5A) or multiple cell stacks 62 (see FIG. 5B).

Each of the plurality of walls 72 may optionally include one or more channels 74 that extend inside the walls 72. In one embodiment, the channels 74 are openings (which may be machined, cast, formed, punched, extruded, etc.) formed either partially or entirely through the walls 72. Other manufacturing techniques could be utilized to form the channels 74. A fluid F may be communicated inside the channels 74 to thermally condition the battery cells 58 of each cell stack 62. The fluid F may be a liquid, such as refrigerant, water, or ethylene glycol mixture, or a gas, such as air.

The channels 74 can be configured in different sizes and shapes to help meter and balance the flow of the fluid F through the walls 72. The size and shape of each channel 74 and the total number of channels 74 provided are not intended to limit this disclosure. Depending on the design of the structural assembly 64, the fluid F may flow linearly within the channels 74 of one wall 72 and may turn at a right angle to flow into other walls 72. In the illustrated embodiment, the channels 74-C of the center wall 72-C include a greater cross-sectional area than the channels 74 of the other walls 72 because the center wall 72-C is positioned between two cell stacks 62 and will therefore require more fluid to achieve similar heat flux capabilities between the adjacent cell stacks 62.

The structural assembly 64 may additionally include an inlet cap 76 and an outlet cap 78. The inlet cap 76 and the outlet cap 78 may be connected to at least one of the walls 72 to provide an inlet and an outlet for receiving and expelling the fluid F. The inlet cap 76 and the outlet cap 78 may be sized to receive a sufficient amount of the fluid F to feed the other walls 72 and expel the fluid F from the walls 72. The walls 72 that receive the inlet cap 76 and the outlet cap 78 may also include additional end caps 80 for closing-off the channels 74 so the fluid F can only exit the structural assembly 64 via the outlet cap 78.

Figure 4:
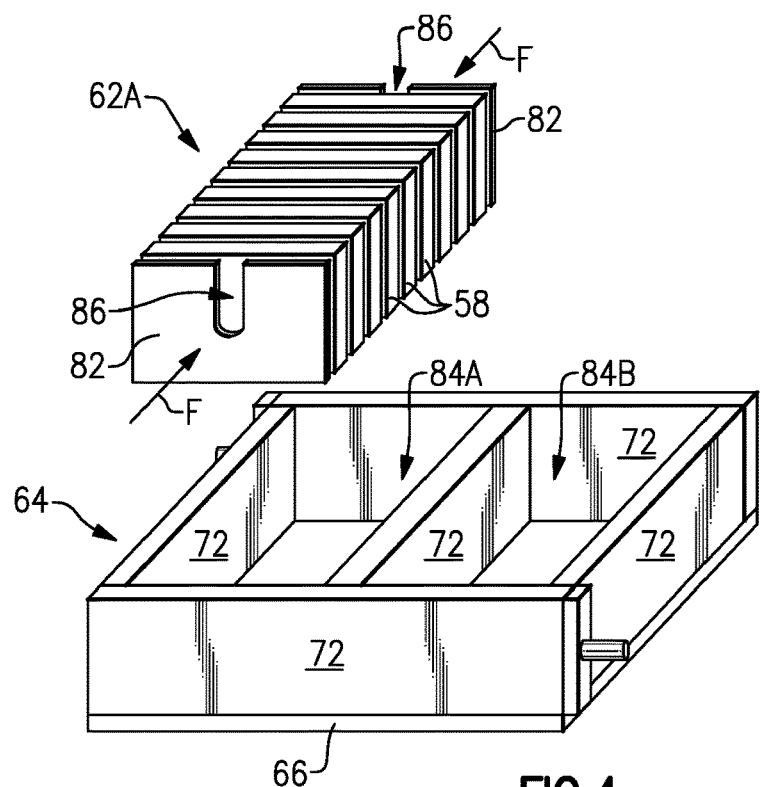
FIG. 4 is an exploded view of selected portions of a battery assembly.
Figures 5A, 5B:
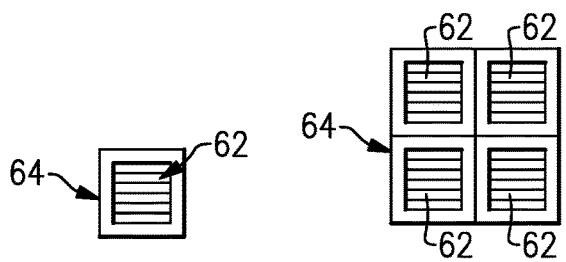
FIGS. 5A and 5B illustrate additional configurations of a structural assembly of a battery assembly.
Figures 6A, 6B:
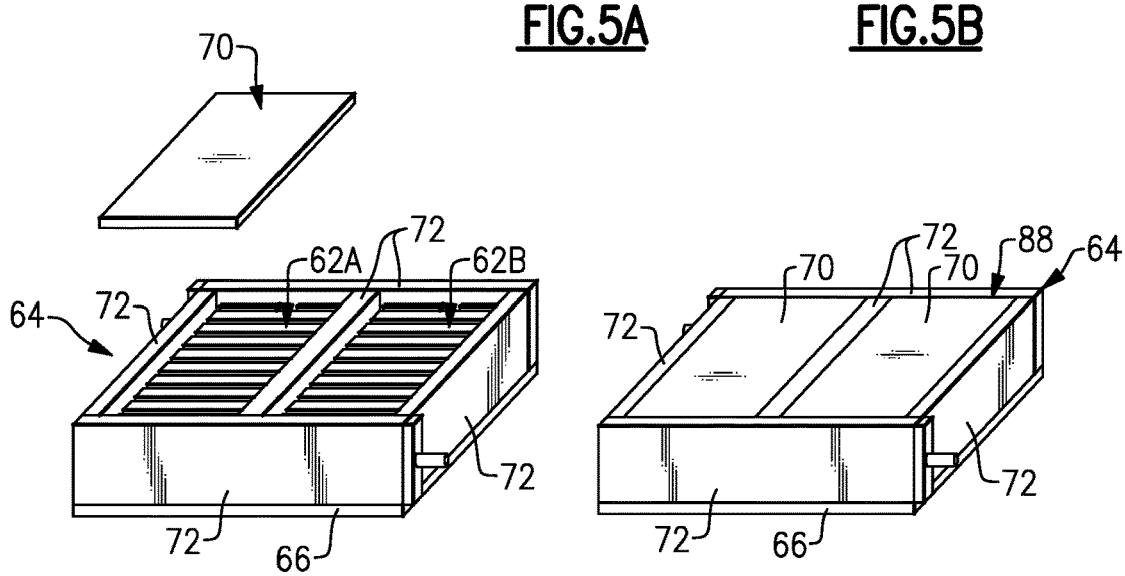
FIGS. 6A and 6B illustrate additional features of the battery assembly of FIG. 4.

FIGS. 4, 6A and 6B schematically illustrate assembly of the battery assembly 24. Referring first to FIG. 3, the battery cells 58 of a first cell stack 62A may optionally be disposed between end spacers 82. Although not shown, additional spacers may optionally be positioned between each battery cell 58 to provide electrical isolation between the adjacent battery cells 58 of the first cell stack 62A. At this stage of the assembly, the battery cells 58 are unbound relative to one another by mechanical fastening devices such as threaded fasteners, brackets, plates and/or straps.

The battery cells 58 of the first cell stack 62 may be compressed, such as with tooling (not shown). In one embodiment, the battery cells 58 are compressed enough to lift and manipulate the first cell stack 62A without the battery cells 58 dropping out by applying a force F at each end spacer 82. The compressed first cell stack 62A is then inserted into a first pocket 84A of the structural assembly 64. The first cell stack 62A may be slightly over-compressed such that it fits into the first pocket 84A. Once the first cell stack 62 is received within the first pocket 84A, the walls 72 of the structural assembly 64 exert a compressive load on the first cell stack 62A and at least partially enclose the first cell stack 62A. The battery cells 58 are contiguous with at least one of the walls 72 of the structural assembly 64 once received within the first pocket 84A (see FIG. 6A). The end spacers 82 may include slots 86 that can be engaged by tooling for lifting and manipulating the first cell stack 62A. The slots 86 may be filled after the tooling has inserted the cell stack 62A and been removed in order to support the battery cells 58 in a more uniform manner and promote a more uniform opportunity for heat transfer at all portions of the battery cells 58 and the walls 72. The end spacers 82 may be made of a material having a relatively low co-efficient of friction that facilitates sliding against the walls 72 for simplifying insertion of the first cell stack 62A into the first pocket 84A of the structural assembly 64. In one non-limiting embodiment, the end spacers 82 are made of ultrahigh molecular weight polypropylene (UHMWPP).

Alternatively, the slots 86 may be omitted, thus leaving end spacers 82 as a more continuous sheet. The first cell stack 62A may be compressed to fit into the pocket 84A. An independent pusher block may be used to slide the first cell stack 62A into the pocket 84A.

If the structural assembly 64 includes additional pockets, additional cell stacks 62 may be received therein. For example, as shown in FIGS. 6A and 6B, a second cell stack 62B may be inserted into a second pocket 84B of the structural assembly 64.

Referring now primarily to FIGS. 6A and 6B, a bus bar module 70 may be positioned over top of each of the first and second cell stacks 62A, 62B. In one non-limiting embodiment, the bus bar modules 70 are cubic shaped and are made of a suitable combination of conductive and insulating materials. Each bus bar module 70 may be located above one of the first and second cell stacks 62A, 62B and can then attached to the battery cells 58, such as via welding, to electrically connect the battery cells 58. In one embodiment, the walls 72 of the structural assembly 64 are sized such that when the first and second cell stacks 62A, 62B and the bus bar modules 70 are installed, a flat (or near flat) top surface 88 is provided (see FIG. 6B).

The base 66 may be attached to the structural assembly 64 either before or after inserting the first and second cell stacks 62A, 62B. The cover 68 (see FIG. 2), however, may be attached to the structural assembly 64 after insertion of the contents of the battery assembly 24. The base 66 and the cover 68 may be structural plates that are joined to the structural assembly 64 in a liquid tight manner such as via welding or adhesion.

Figure 7:
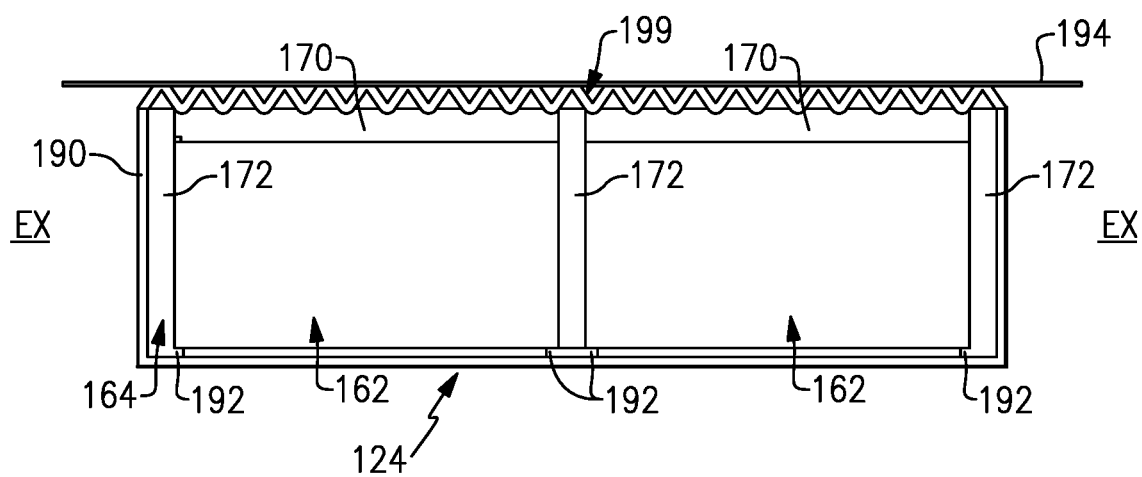
FIG. 7 illustrates a battery assembly according to another embodiment of this disclosure.

FIG. 7 illustrates another exemplary battery assembly 124. In this disclosure, like reference numbers designate like elements where appropriate and reference numerals with the addition of 100 or multiples thereof designate modified elements that are understood to incorporate the same features and benefits of the corresponding original elements. In this exemplary embodiment, the battery assembly 124 includes one or more cell stacks 162, a structural assembly 164 including a plurality of walls 172, a bus bar module 170 for each cell stack 162, and a resilient envelope 190.

In one embodiment, the walls 172 of the structural assembly 164 include flanges 192. The flanges 192 support and act as depth stops for insertion of the cell stacks 162. Each wall 172 may include one flange 192 (e.g., at exterior walls) or two flanges 192 (e.g., at interior walls).

In another embodiment, the resilient envelope 190 is disposed around an entire perimeter of the battery assembly 124 to resiliently and hermetically seal the battery assembly 124 relative to the exterior environment EX. The resilient envelope 190 may be a polymer such as high density polyethylene (HDPE). Other resilient envelope materials are also contemplated. The resilient envelope 190 may exhibit a relatively thin profile, portions of which may act as a compressible spring. For example, portions of the resilient envelope 190 may include corrugations 199 (here, disposed at the top portion of the resilient envelope 190) that are compressible to allow the battery assembly 124 to be press fit against a mounting surface 194. The battery assembly 124 could then be mounted to the mounting surface 194 using brackets, straps or other fastening devices. In this way, the battery assembly 124 may exhibit zero clearance relative to the mounting surface 194.

The battery assemblies described by this disclosure provide compact designs that leave near zero air spaces inside the assembly. This reduces the amount of air available to expand/contract inside the assembly. Furthermore, the exemplary battery assemblies provide a packaging solution that reduces the number and size of packaging components, substantially eliminates conventional array retention components, and substantially eliminates threaded fastener connections.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

The invention claimed is:

1. A battery assembly, comprising:
a first cell stack including a plurality of battery cells; and
a structural assembly including a plurality of walls joined together to form a first pocket to receive said first cell stack, wherein said first pocket is sized such that said first cell stack will only fit into said first pocket when said first cell stack is compressed, wherein said walls are configured to exert a compressive load on said first cell stack as soon as said first cell stack is inserted into said first pocket.

2. The battery assembly as recited in claim 1, wherein said plurality of battery cells are individual cells disposed side-by-side and unbound relative to one another.

3. The battery assembly as recited in claim 2, wherein each of said plurality of battery cells is contiguous with at least one of said walls.

4. The battery assembly as recited in claim 1, comprising a second cell stack received within a second pocket formed by said walls, wherein said second pocket is sized such that said second cell stack will only fit into said second pocket when said second cell stack is compressed, and wherein said walls are configured to exert a compressive load on said second cell stack as soon as said second cell stack is inserted into said second pocket.

5. The battery assembly as recited in claim 4, wherein a center wall of said walls separates said first pocket from said second pocket.

6. The battery assembly as recited in claim 5, wherein each of said walls includes at least one channel configured to communicate fluid to thermally condition said first and second cell stacks.

7. The battery assembly as recited in claim 1, comprising a bus bar module positioned over top of said first cell stack.

8. The battery assembly as recited in claim 1, wherein a base is positioned at a bottom of said structural assembly and a cover is positioned at a top of said structural assembly.

9. The battery assembly as recited in claim 1, comprising a resilient envelope disposed around an entire perimeter of said structural assembly.

10. The battery assembly as recited in claim 1, wherein each of said plurality of walls includes at least one channel configured to communicate fluid to thermally condition said plurality of battery cells.

11. The battery assembly as recited in claim 10, wherein some of said plurality of walls include a channel of a different cross-sectional size than a channel of others of said plurality of walls.

12. The battery assembly as recited in claim 1, wherein said walls are configured to exert a compressive load on said first cell stack immediately after said first cell stack is inserted into said first pocket.

13. A method, comprising:
applying a force to a cell stack of a battery assembly such that the cell stack is compressed; and
while the cell stack is compressed, inserting the cell stack into a pocket of a structural assembly such that walls of the structural assembly exert a compressive load against the cell stack as soon as the cell stack is inserted into the pocket, wherein, before the cell stack is compressed, the cell stack will not fit into the pocket.

14. The method as recited in claim 13, wherein applying the force to the cell stack includes:
disposing a plurality of battery cells of the cell stack between opposing end spacers; and
applying a force to the cell stack at the opposing end spacers.

15. The method as recited in claim 13, wherein the structural assembly is configured to at least partially enclose the cell stack.

16. The method as recited in claim 13, comprising:
sealing the cell stack of the battery assembly relative to an exterior environment after inserting the cell stack.

17. The method as recited in claim 13, wherein fluid is directed through a plurality of channels of said walls to thermally condition the cell stack.

18. The method as recited in claim 17, wherein at least one channel is of a different cross-sectional size than at least one other channel.

\* \* \* \* \*